US011119235B2

(12) United States Patent
Liu et al.

(10) Patent No.: US 11,119,235 B2
(45) Date of Patent: Sep. 14, 2021

(54) AUTOMATED SEISMIC INTERPRETATION USING FULLY CONVOLUTIONAL NEURAL NETWORKS

(71) Applicant: ExxonMobil Upstream Research Company, Spring, TX (US)

(72) Inventors: Wei D. Liu, Schenectady, NY (US); Diego A. Hernandez, Tomball, TX (US); Niranjan A. Subrahmanya, Mountain View, CA (US); D. Braden Fitz-Gerald, Cheyenne, WY (US)

(73) Assignee: ExxonMobil Upstream Research Company, Spring, TX (US)

( * ) Notice: Subject to any disclaimer, the term of this patent is extended or adjusted under 35 U.S.C. 154(b) by 521 days.

(21) Appl. No.: 16/059,567

(22) Filed: Aug. 9, 2018

(65) Prior Publication Data

US 2019/0064378 A1  Feb. 28, 2019

Related U.S. Application Data

(60) Provisional application No. 62/550,069, filed on Aug. 25, 2017.

(51) Int. Cl.
*G01V 1/34* (2006.01)
*G01V 1/28* (2006.01)
(Continued)

(52) U.S. Cl.
CPC ............. *G01V 1/345* (2013.01); *G01V 1/28* (2013.01); *G01V 1/30* (2013.01); *G01V 1/302* (2013.01);
(Continued)

(58) Field of Classification Search
None
See application file for complete search history.

(56) References Cited

U.S. PATENT DOCUMENTS

| 5,444,619 A | 8/1995 | Hoskins et al. |
| 5,940,777 A | 8/1999 | Keskes |

(Continued)

FOREIGN PATENT DOCUMENTS

| EP | 0 561 492 A2 | 9/1993 |
| WO | WO 2011/056347 A1 | 5/2011 |

(Continued)

OTHER PUBLICATIONS

Huang, Lei; Dong, Xishuang; Clee, T. Edward; "A scalable deep learning platform for identifying geologic features from seismic attributes;" Mar. 2017; Special Section: Data analytics and machine Learning; p. 249-256 (Year: 2017).*

(Continued)

*Primary Examiner* — Mohammad K Islam
*Assistant Examiner* — Terence E Stifter, Jr.
(74) *Attorney, Agent, or Firm* — ExxonMobil Upstream Research Company, Law Department

(57) ABSTRACT

A method to automatically interpret a subsurface feature within geophysical data, the method including: storing, in a computer memory, geophysical data obtained from a survey of a subsurface region; and extracting, with a computer, a feature probability volume by processing the geophysical data with one or more fully convolutional neural networks, which are trained to relate the geophysical data to at least one subsurface feature, wherein the extracting includes fusing together outputs of the one or more fully convolutional neural networks.

19 Claims, 9 Drawing Sheets

(51) Int. Cl.
G01V 1/30 (2006.01)
G06K 9/62 (2006.01)
G06N 3/04 (2006.01)
G06N 3/08 (2006.01)

(52) U.S. Cl.
CPC ......... *G06K 9/6256* (2013.01); *G06N 3/0454* (2013.01); *G06N 3/08* (2013.01); *G01V 2210/64* (2013.01); *G01V 2210/642* (2013.01)

(56) References Cited

U.S. PATENT DOCUMENTS

| | | | |
|---|---|---|---|
| 6,374,185 | B1 | 4/2002 | Taner et al. |
| 6,438,493 | B1 | 8/2002 | West et al. |
| 6,662,112 | B2 | 12/2003 | Eastwood et al. |
| 6,735,526 | B1 | 5/2004 | Meldahl et al. |
| 7,844,402 | B2 | 11/2010 | Klein et al. |
| 8,055,026 | B2 | 11/2011 | Pedersen |
| 9,366,772 | B2 * | 6/2016 | Imhof .......... G01V 1/282 |
| 9,489,769 | B2 | 11/2016 | Luneburg et al. |
| 9,618,639 | B2 | 4/2017 | Witte et al. |
| 2017/0364795 | A1 | 12/2017 | Anderson et al. |
| 2018/0106917 | A1 * | 4/2018 | Osypov .......... G06N 20/00 |

FOREIGN PATENT DOCUMENTS

| | | |
|---|---|---|
| WO | WO 2017/188858 A1 | 11/2017 |
| WO | WO 2018/026995 A1 | 2/2018 |
| WO | WO 2018/031051 A1 | 2/2018 |
| WO | WO 2018/072815 A1 | 4/2018 |
| WO | WO 2018/148492 A1 | 8/2018 |
| WO | WO 2018/082790 A1 | 11/2018 |

OTHER PUBLICATIONS

Ronneberger, Olaf; Fischer, Phillip; Brox, Thomas; "U-Net: Convolutional Networks for Biomedical Image Segmentation;" May 18, 2015; p. 1-8 (Year: 2015).*

Araya-Polo, Mauricio; Dahlke, Taylor; Frogner, Charlie; Zhang, Chiyun; Poggio, Tomasco; Hohl, Detlef; Automated Fault Detection without Seismic Processing; Mar. 2017; Society of Exploration Geophysicists; The Leading Edge vol. 36, Issue 3; p. 208-214 (Year: 2017).*

Valentin Tschannen, et al. (Jun. 2017) "Facies classification from well logs using an inception convolutional network", arxiv.org, Cornell University Library, 201 Olin Library Cornell University Ithaca, NY 14853, Jun. 2, 2017 XP080767099.

Akcelik V, et al. (2011) "Multiparameter Material Model and Source Signature Full Waveform Inversion," *SEG Technical Program Expanded Abstracts*, vol. 30, pp. 2406-2410.

Araya-Polo, M. (2017) "Automated fault detection without seismic processing," *The Leading Edge*, v. 36, No. 3, pp. 208-214.

Denli, H. (2013) "Full-wavefield inversion for acoustic wave velocity and attenuation," *SEG Technical Program Expanded Abstracts*, v. 32, pp. 980-985.

Gibson, D. (2003) "Automatic Fault Detection for 3D Seismic Data," *DICTA* pp. 821-830.

Goodfellow, I. et al. (2014) "Generative Adversarial Nets," *Advances in Neural Information Processing Systems 27, NIPS*, xx pgs.

He, K. et al. (2016) "Deep Residual Learning for Image Recognition," *2016 IEEE Conference on Computer Vision and Pattern Recognition (CVPR)*, pp. 770-778.

Jiang, Y. (2016) "Detecting prospective structures in volumetric geo-seismic data using deep convolutional neural networks," Poster presented at the annual foundation council meeting of the Bonn-Aachen International Center for Information Technology (b-it), xx pgs.

Kingma, P. D. et al. (2015) "Adam: A Method for Stochastic Optimization," *ICLR—Conference Paper*, 15 pgs.

Koenderink, J. J. et al. (1994) "Two-plus-one-Dimensional differential geometry," *Pattern. Recognition Letters*, v. 15, No. 5, pp. 439-443.

LeCun, Y. (2015) "Deep Learning," *Nature* v. 521, doi:10.1038/nature14539, pp. 436-444.

Long, J. et al. (2015) "Fully Convolutional Networks for Semantic Segmentation," *Proceedings of the Ieee Computer Society Conference on Computer Vision and Pattern Recognition*, pp. 3431-3440.

Paleoscan software (2018) available from Eliis, http://www.eliis.fr/products/paleoscan-software.

Ronneberger, O. et al. (2015) "U-Net: Convolutional Networks for Biomedical Image Segmentation," *Medical Image Computing and Computer-Assisted Intervention (MICCAI)*, Springer, LNCS, vol. 9351, pp. 234-241.

Simonyan, K. (2015) "Very Deep Convolutional Networks for Large-Scale Image Recognition," *arXiv technical report*, 15 pgs.

Zhang, C. (2016) "Automated Geophysical Feature Detection with Deep Learning," *GPU Technology Conference*, 22 pgs.

Guillen, P. et al. (2015) "*Supervised learning to detect salt body*", SEG Tech. Prog. Expanded Abstracts 2015, Aug. 19, 2015, pp. 1826-1829.

Hami-Eddine, K. et al. (2012) "*Anomaly Detection using dynamic Neural Networks, classification of prestack data*", SEG Tech. Prog. Expanded Abstracts 2012, Oct. 25, 2012, pp. 1-5.

Hami-Eddine, K. et al. (2015) "*A new technique for lithology and fluid content prediction from prestack data: An application to a carbonate reservoir*", Interpretation, vol. 3, No. 1 (Feb. 1, 2015), pp. S19-S32.

Huang, L. et al. (2017) "*A scalable deep learning platform for identifying geologic features from seismic attributes*", The Leading Edge, vol. 36, No. 3 (Mar. 30, 2017), pp. 249-256, XP055474335.

Jiang, Ying (2017) "*Detecting geological structures in seismic volumes using deep convolutional neural networks*", 68pgs. Retrieved from the internet: URL: http://publica.fraunhofer.de/eprints/um_nbn_de_0011-n-5070594.pdf, XP055523502.

Marroquin, I. et al. (2009) "*A visual data-mining methodology for seismic facies analysis: Part 1—testing and comparison with other unsupervised clustering methods*", Geophysics vol. 74, No. 1 (Feb. 1, 2009), pp. P1-P11.

* cited by examiner

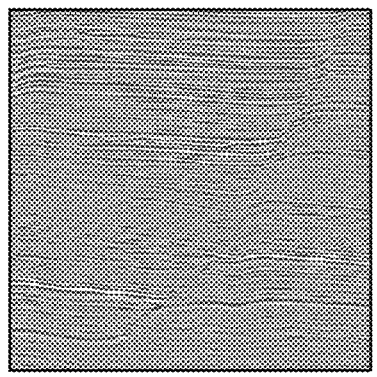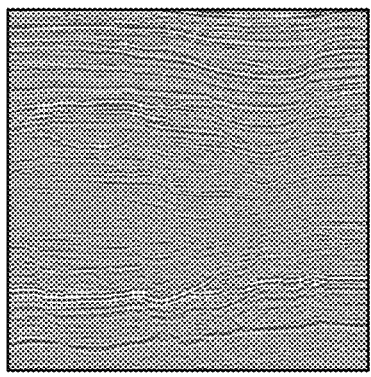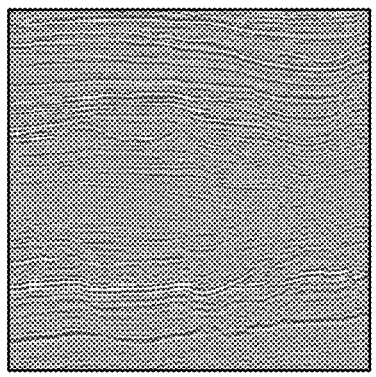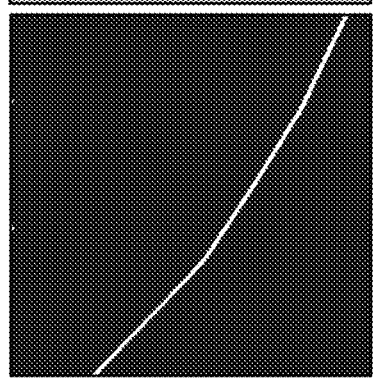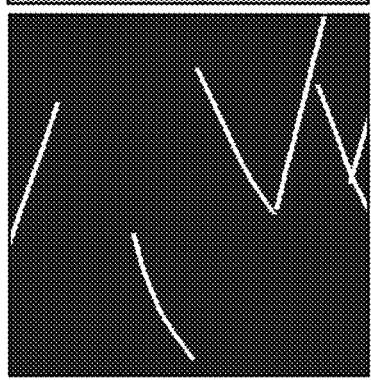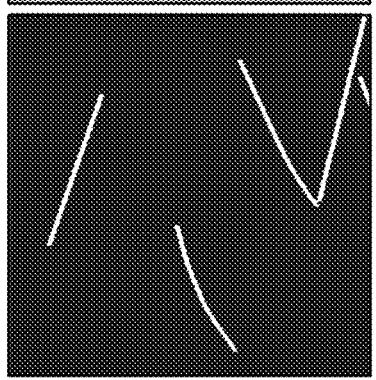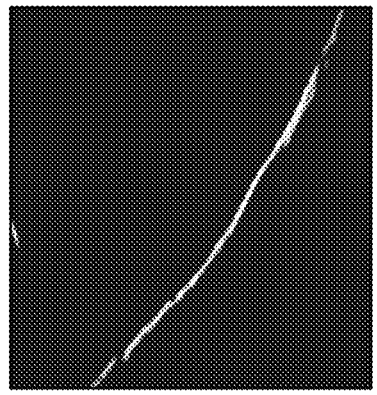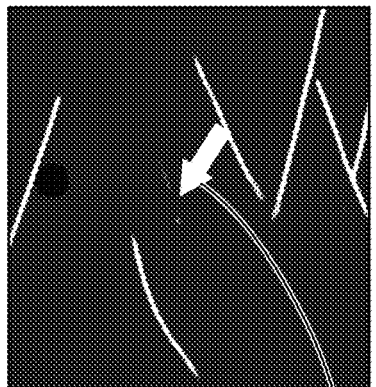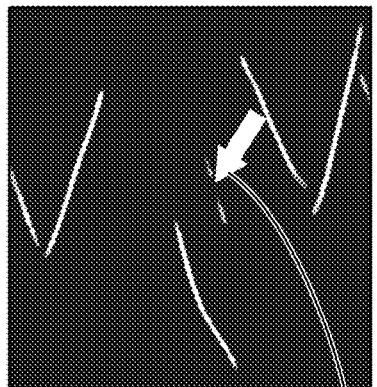
*FIG. 5A*  *FIG. 5B* 501  *FIG. 5C* 501

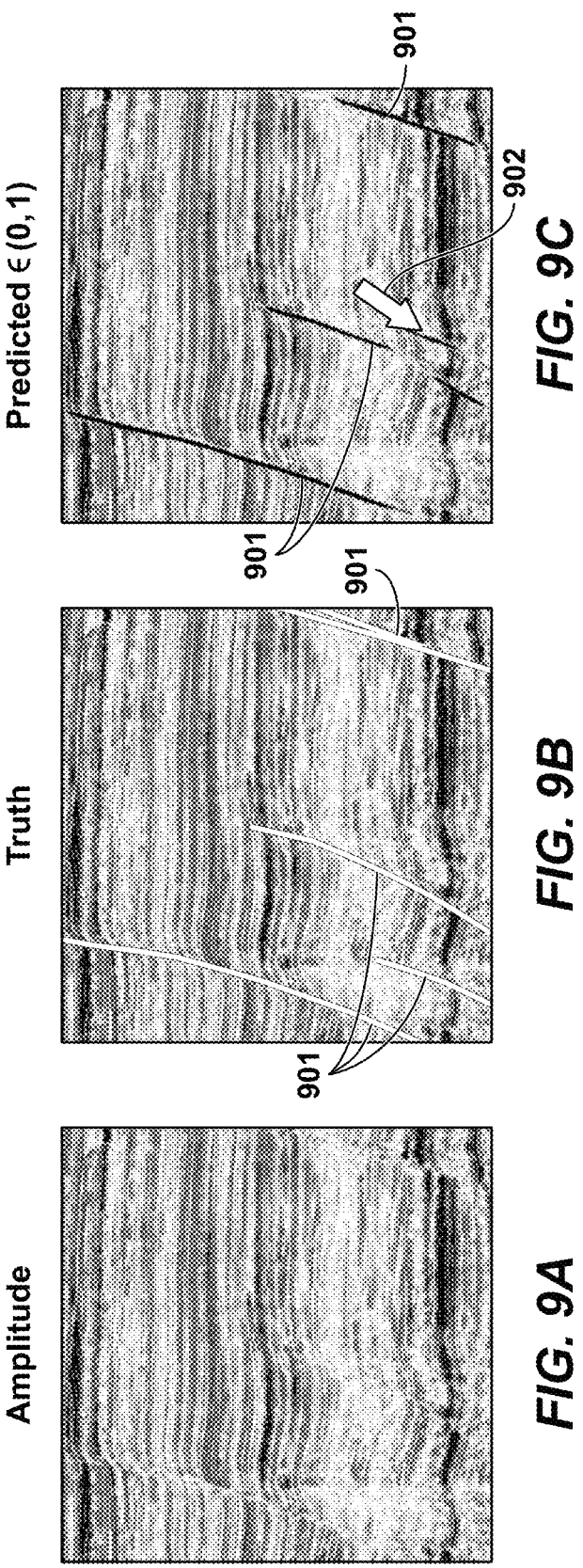

AUTOMATED SEISMIC INTERPRETATION USING FULLY CONVOLUTIONAL NEURAL NETWORKS

CROSS REFERENCE TO RELATED APPLICATION

This application claims the priority benefit of U.S. Provisional Patent Application No. 62/550,069, filed Aug. 25, 2017 entitled AUTOMATED SEISMIC INTERPRETATION USING FULL CONVOLUTIONAL NEURAL NETWORKS, the disclosure of which is incorporated herein by reference.

TECHNOLOGICAL FIELD

The exemplary embodiments described herein relate generally to the field of geophysical prospecting, and more particularly to the analysis of seismic or other geophysical subsurface imaging data. Specifically, the disclosure describes exemplary embodiments that use convolutional neural networks for automatically detecting and interpreting subsurface features that can be highlighted using a contiguous region of pixels/voxels in a seismic volume.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

A conventional hydrocarbon exploration workflow currently focuses on seismic imaging and geological interpretation of the resulting images. While a lot of effort has gone into improving and automating many aspects of seismic imaging [1,2], interpretation has largely remained a labor intensive process. Specifically, horizon interpretation and fault interpretation are two critical and time consuming aspects of the seismic interpretation workflow that require a significant amount of time and manual effort. Recent developments in vendor technology have helped reduce the time required for horizon interpretation [3] through the development of automated/semi-automated computational techniques [4], but robust methods for fault interpretation are lacking. There have been several attempts at completely or partially automating fault interpretation [5] using stacked/migrated seismic data, but due to the inherent uncertainty in the problem there has not been viable approaches developed that significantly reduce the overall time of interpretation.

Based on the recent success in applying deep learning and convolutional neural networks to image recognition problems [6], there have been recent attempts to apply this technology to the seismic fault interpretation problem. Specifically [7, 8] describe a technique to apply deep learning to the raw traces directly using a special loss function (Wasserstein loss), but the computational complexity of the technique requires significant down sampling resulting in a loss of accuracy in fault interpretation. In [9], a patch based approach to seismic fault and feature (such as channel) interpretation is described using deep learning. This is the approach that is closest in spirit to the proposed approach, but their use of a patch around each pixel/voxel to detect the feature at the center of the patch makes it very computationally intensive for application on large datasets. Moreover, the use of a network that is not fully convolutional (VGG Net [10]) means that the input patch size is fixed and, when applied to seismic volumes, produces an increase in the computational expense due to redundant calculations (as a separate patch needs to be processed to label each voxel). When a network is not fully convolutional, it cannot take arbitrary patch sizes. Flexible or arbitrary patch sizes are useful for seismic feature detection given the nature of their different sizes and scales depending on the type of geologic environments and structure styles.

Conventional methods have one or more of the following short-comings.
1. They require the creation and handling of additional attribute volumes (such as semblance).
2. They require the selection of a fixed patch size, which is typically small (e.g., 32×32) not just for computational efficiency, but also to make training the statistical model feasible. For example, if large patch sizes are used, then as one moves the patch over a fault by one pixel, the contents of the patch will be highly correlated due to the large overlap, but the labels will change from positive to negative as the center of the patch moves over a fault. This makes models that take patches as input and try to predict the feature at the center of the patch numerically challenging to train as the patch size increases. However, in practice, features such as faults can be recognized in areas of poor signal to noise ratio only by looking at large regions (such as 512 by 512) to enhance hints of fault presence. Moreover, due to the high degree of correlation in input images as we move over fine features such as faults, there is a loss in the accuracy with which these features can be localized in the output map.
3. They require application of the method to one patch for every pixel/voxel that needs to be labeled (making the run time computationally intense). The method we use can generate labels for all pixels in a patch in one shot reducing the computational complexity during implementation by a few orders of magnitude (e.g., by up to 5 orders of magnitude for patches of size 512×512).

SUMMARY

A method to automatically interpret a subsurface feature within geophysical data, the method including: storing, in a computer memory, geophysical data obtained from a survey of a subsurface region; and extracting, with a computer, a feature probability volume by processing the geophysical data with one or more fully convolutional neural networks, which are trained to relate the geophysical data to at least one subsurface feature, wherein the extracting includes fusing together outputs of the one or more fully convolutional neural networks.

In the method, the geophysical data can be a migrated or stacked seismic volume.

In the method, the geophysical data can include attributes extracted from a migrated or stacked seismic volume.

The method can further include training the one or more fully convolutional neural networks with training data, wherein the training data includes synthetically generated subsurface physical models consistent with provided geological priors and computer simulated data based on governing equations of geophysics and the synthetically generated subsurface physical model.

In the method, the training data can include migrated or stacked seismic data with manual interpretations.

In the method, the training data can be a blend of synthetic and real data.

In the method, the one or more fully convolutional neural networks can be based on a U-net architecture.

In the method, the one or more fully convolutional neural networks can be based on augmentations to a U-net architecture.

In the method, the one or more artificial neural networks can use 3D convolution or filtering operations.

In the method, a plurality of neural networks can be used and the plurality of neural networks have different architectures and the training includes training the plurality of neural networks with different datasets.

In the method, the fusing can done using voxelwise operations.

In the method, the voxelwise operations include averaging.

In the method, the voxelwise operations include taking a maximum value.

In the method, the fusing can be done by feeding multiple prediction volumes, and the original data, into another artificial neural network.

In the method, the at least one subsurface feature is one or more of faults, channels, or environments of deposition.

In the method, the at least one subsurface feature is a fault.

In the method, the extracting can include performing seismic feature interpretation via voxelwise labeling.

In the method, the extracting can include running a learned 2D or 3D model on an entirety of a seismic volume to obtain a fault interpretation of the seismic volume all at once.

In the method, the extracting can include generating an output label map that is related to a size of an input image.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 5A illustrates an example of input training patches.

FIG. 5B illustrates an example of target fault masks for input training patches.

FIG. 5C illustrates predicted fault masks for input training patches.

FIGS. 9A, 9B, and 9C illustrate exemplary results obtained from the present technological advancement.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement can be embodied as a method based on fully convolutional neural networks with image to image or volume to volume training for automatically detecting and interpreting subsurface features that can be highlighted using a contiguous region of pixels/voles in a seismic volume (e.g., a subsurface feature, such as faults, channels, environments of deposition, etc.). The present technological advancement can work with stacked or migrated seismic data with or without additional attributes such as semblance. The output of the method can be a feature probability volume that can then be further post-processed to extract objects that integrate into a subsurface interpretation workflow. A feature probability volume is a 4D tensor which conveys a vector at each voxel indicating the likelihood of that voxel belonging to a certain class (e.g., fault, channel, hydrocarbon trap, salt, etc.). The following discussion will use fault interpretation as an example application of the present technological advancement. However, this is not intended to be limiting as the present technological advancement can be used to detect channels, salt-bodies, etc. when user provided labels are available.

The present technological advancement can overcome all of the above stated problems of conventional techniques. The present technological advancement can use the latest insights from the field of deep learning. ANNs (artificial neural networks), particularly deep neural networks (DNN) are built on the premise that they can be used to replicate any arbitrary continuous functional relationships including non-linear relationships. DNNs can include "layers" of weighted nodes that are activated by inputs from previous layers. These networks are trained with examples in which the correct/true output (label) is known for a given input; the weight parameters in the nodes of the network evolve due to the minimization of the error between prediction and true value. This causes the network to become an increasingly better predictor of the training examples and, ultimately, of any example of a data that is similar in nature to the training data. Convolutional neural networks are a class of deep neural networks that are specially suited to processing spatial data [6].

Figure 1:
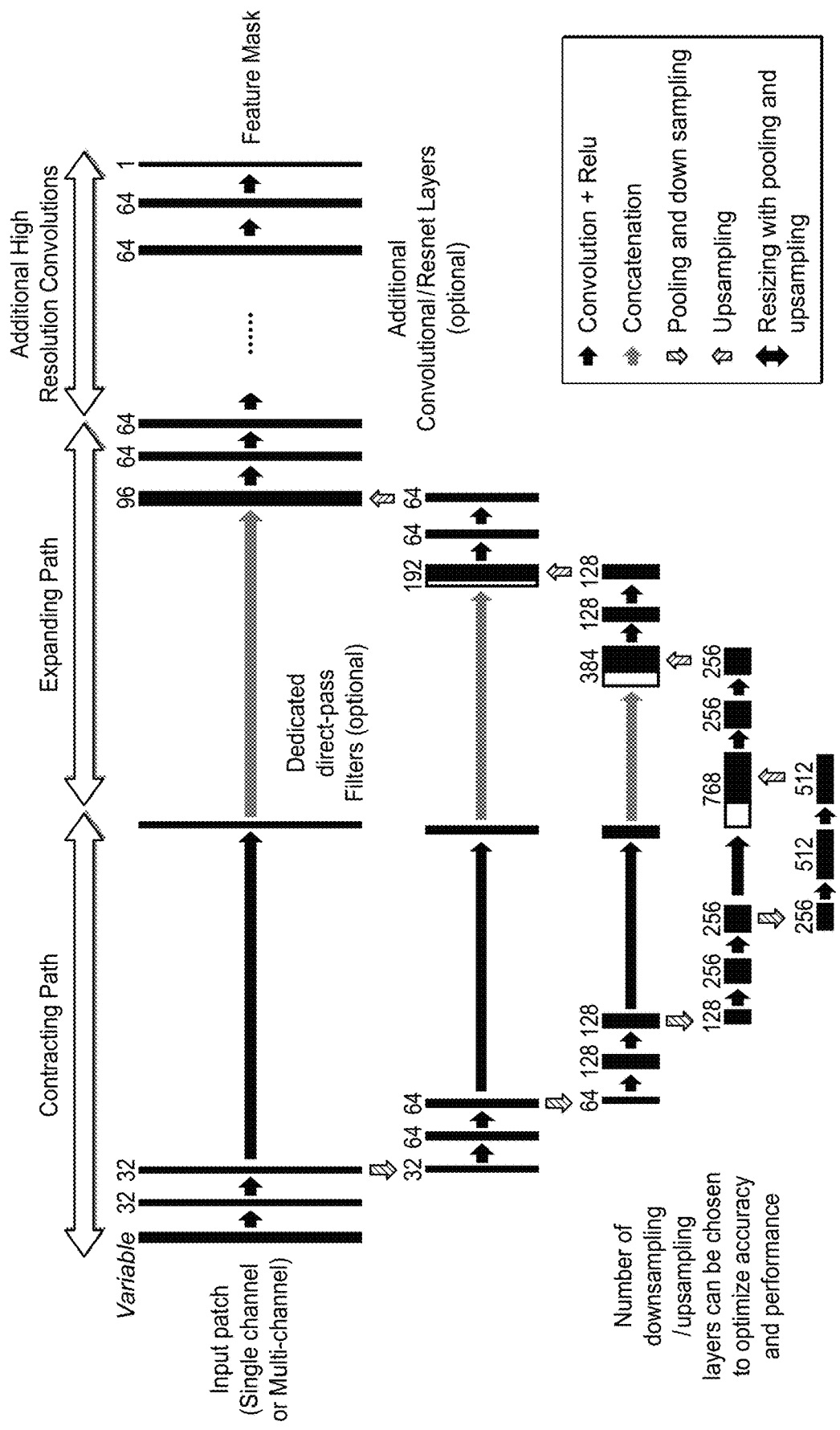
FIG. 1 illustrates an example of a fully convolutional network architecture (It is based on the U-net architecture but highlights modifications important for improved accuracy in localization of fine features such as faults).

The present technological advancement can leverage a technical approach used in the field of computer vision, specifically semantic segmentation. In segmantic segmentation, each pixel/voxel is labeled with a class of objects (i.e., fault/non-fault). Convolutional neural networks where layers are restricted to only perform certain operations (limited to convolution, correlation, element-wise nonlinearities, down-sampling, up-sampling, up-convolution) can be termed "fully convolutional networks" and these networks can take inputs of arbitrary size and produce correspondingly-sized outputs with efficient inference and learning. A fully convolutional network is made up of a select set of operations that can be applied to inputs of any size (this includes operations like convolution, pooling, upsampling, concatenating channels, adding channels etc.). More traditional networks usually have some convolutional layers followed by a layer that vectorizes all the layers and then uses a multi-layer perceptron network to do the final classification task. The multi-layer perceptron can only handle a fixed number of inputs (hence a fixed number of pixels) and is therefore not suitable for application to input images of varying sizes. These fully convolutional networks are ideally suited to spatially dense prediction tasks [11]. Seismic feature interpretation via voxelwise labeling falls under this category. Although the original paper mainly describes 2D data processing, similar concepts can be used to develop 3D fully convolutional networks to process 3D seismic data. The present technological advancement can be used with both 2D and 3D model training. Specifically, an exemplary embodiment of the present technological advancement can utilize the "U-net" network architecture outlined in [12] and its customized extensions (as indicated in FIG. 1) as a primary candidate for generating fully convolutional networks in 2D and 3D. This network architecture, initially applied to biomedical imaging tasks, has the desirable feature of fusing information from multiple-scales to increase the accuracy in image segmentation.

While the U-net network architecture is described, the present technological advancement can use other fully convolutional neural network architectures, and can even work with an ensemble of neural networks having different architectures and can be trained on different datasets. One way to use multiple networks is to train a network to identify a feature looking at it from different views (X,Y,Z views) and then combine the predictions for each voxel (using a fusion rule such as taking the maximum of the three predictions). Another method could involve training different networks to detect features at different scales, i.e., one network looks at patches of size 128×128 pixels while another looks at patches of size 512×512 pixels. These methods are presented as examples of using multiple networks and should not be considered as the only way under consideration.

FIG. 1 illustrates an example of a fully convolutional augmented U-net architecture. Each square or rectangular shaded box corresponds to a multi-channel feature map. The number of the channels or filters is denoted on top of the box. The filters are not fixed, and learn from the data. White boxes represent copied feature maps. The arrows denote the different operations.

The network architecture of FIG. 1 is based on the U-net architecture described in [12] with potential augmentation/modification as described below. The augmented U-net architecture includes a contracting path (left side), an expansive path (right side) and additional convolutional layers at the highest resolution. The contracting path includes the repeated application of 3×3 convolutions followed by a rectified linear unit (ReLU) and down sampling (using max pooling or strided convolutions) operation. The number of convolutional filters in each layer and the scale of down-sampling is set by the user. Every step in the expansive path includes an up sampling of the feature map followed by a 2×2 convolution, a concatenation with the correspondingly cropped feature maps from the contracting path, and multiple 3×3 convolutions, each followed by a ReLU. The cropping is used due to the loss of border pixels if padding is not used. Finally, multiple convolutional layers (or residual layers [13]) may be added at a resolution equivalent to the input image. At the final layer, a 1×1 convolution is used to map each multi-component feature vector to the desired number of classes. This vectorized output of the network at each pixel is stored at the location of pixel to generate a 4D tensor that is the feature probability volume. The outputs may occur in different orientations, depending on the training scheme. In this particular approach, the network was trained in x, y, z directions. Therefore, the results were fused to provide the final fault probability volume in 3D.

The main computational cost of this U-net like architecture occurs only once, up-front, during the training of the network. Once the convolutional network is trained, predictions can be produced for entire slices (in 2D) or volumes (in 3D) in a fraction of the training time. The accuracy of such a network is significantly better than traditional approaches not based on deep learning. It is also significantly better than prior deep learning approaches to seismic interpretation as it needs a few orders of magnitude less time for predictions. This means that automated seismic interpretation can now become feasible, both, in terms of achieving a level of accuracy in predictions that could have a significant impact on reducing interpretation time, and in performing the task in acceptable amount of time.

Figure 6:
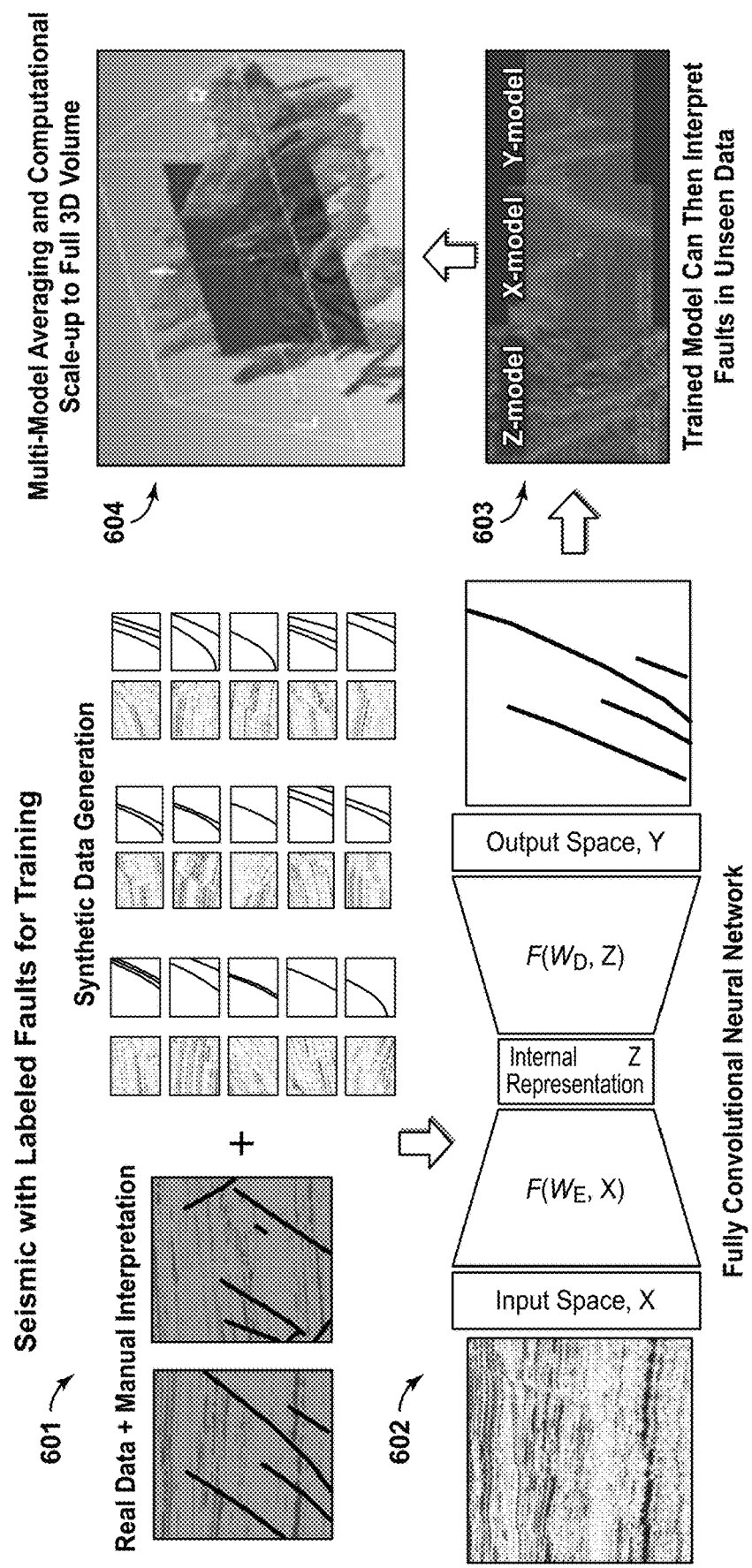
FIG. 6 illustrates an exemplary method embodying the present technological advancement.

Below is a discussion of exemplary steps that can be used to implement an embodiment of the present technological advancement. Not all steps may be necessary in every embodiment of the present technological advancement. FIG. 6 illustrates an exemplary method embodying the present technological advancement. Fault probability volumes generated from models run on the three orthogonal views can be fused to generate the final fault volume (see step 604 in FIG. 6).

Data Generation—Step 601.

Figure 2B:
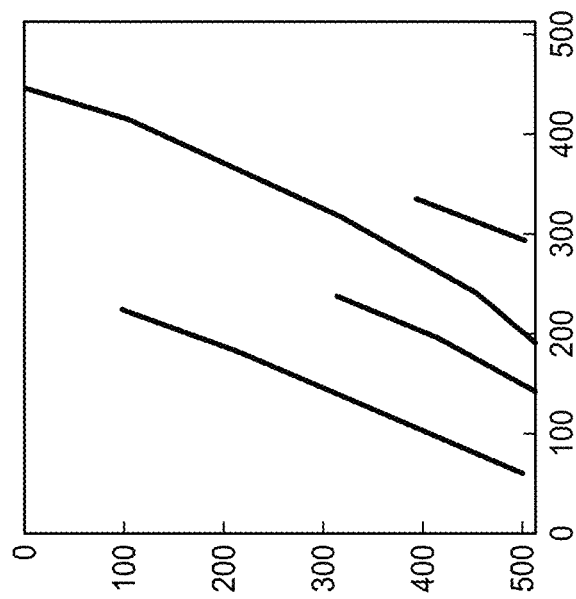
FIG. 2B illustrates an example of a manually interpreted fault mask as an output.
Figure 2A:
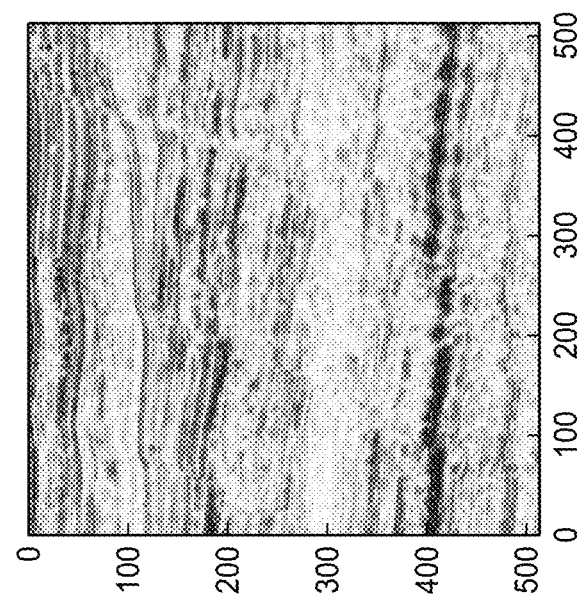
FIG. 2A illustrates an example of stacked seismic data as an input.
Figure 3:
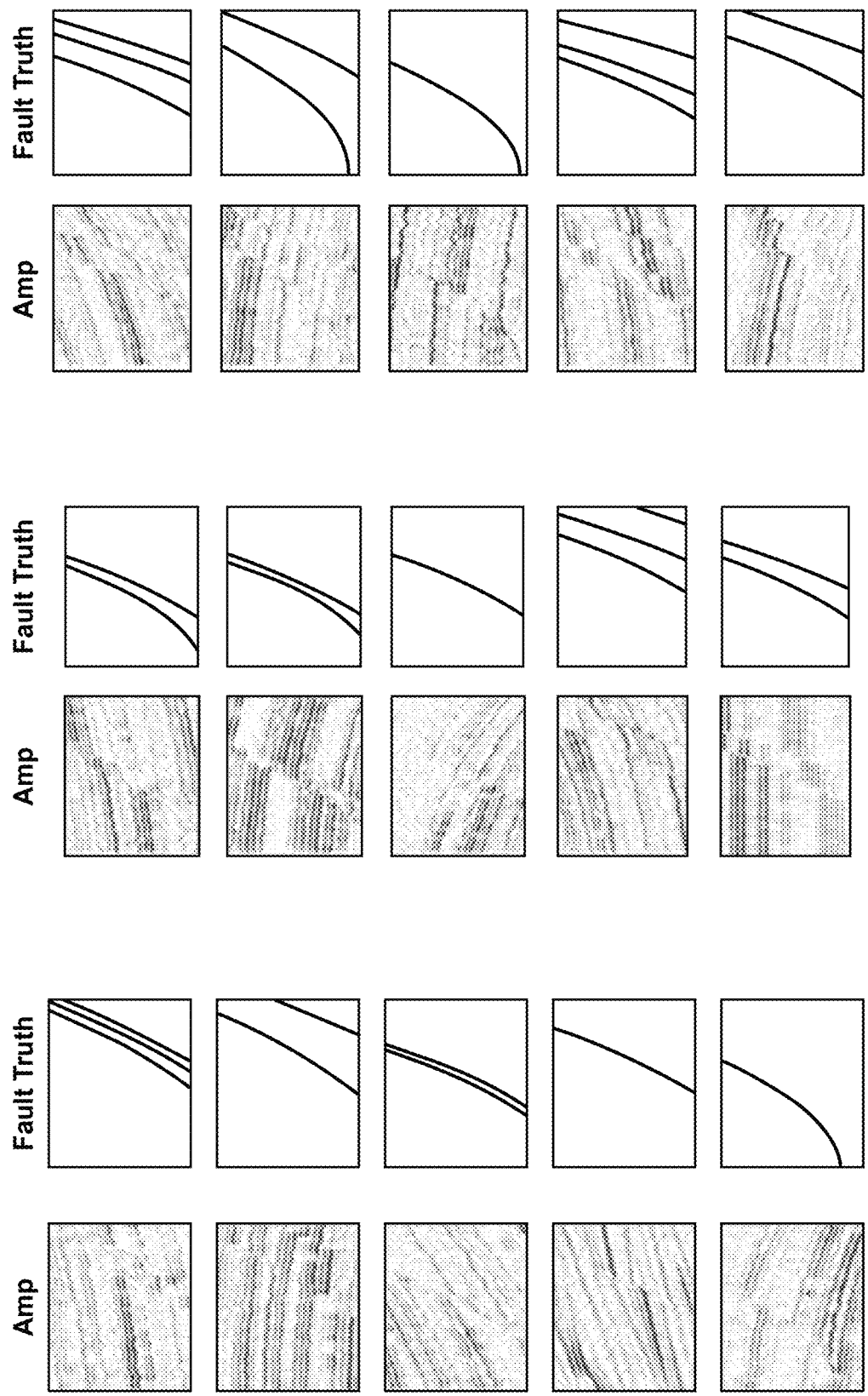
FIG. 3 illustrates an example of synthetic seismic data as input and synthetically induced faults as output.

Training a fully convolutional neural network requires providing multiple pairs of input seismic and target label patches or volumes. A patch refers to an extracted portion of a seismic image (2D or 3D) that represents the region being analyzed by the network. The patch should contain sufficient information and context for the network to recognize the features of interest. This can be done by extracting patches of sufficient size from real seismic data (see FIG. 2A) with manually interpreted fault masks (see FIG. 2B) as labels. Due to the highly variable signal to noise ratio present in seismic data, manual interpretations will always have some error. In order to overcome this problem, the present technological advancement can take the simple approach of annotating pixels/voxels around a manually interpreted fault as faults as well. For synthetic data, the present technological advancement can build appropriate rock property volumes and artificially introduce faults by sliding the rock property volumes. The seismic image is then generated from this "faulted" volume using wave propagation models or convolution models (see FIG. 3). Image augmentation (by mirroring the data, rotating the data etc.) can be used to make the training data cover a wider region of applicability.

The geophysical data described in this example is seismic data, but other types of data (gravity, electromagnetic) could be used. The present technological advancement is not limited to seismic data. The geophysical data could be a migrated or stacked seismic volume. The geophysical data could include attributes extracted from migrated or stacked data.

Training—Step 602.

Training a fully convolutional neural network involves learning millions of parameters that define the filters applied to the input data at various scales. The network can learn those millions of parameters by optimizing the value of the parameters to minimize a discrepancy measure based on comparing network predictions with the training material provided by the user. The discrepancy measure could include a number of standard loss functions used in machine learning such as pixel/voxel wise losses ("squared loss", "absolute loss", "binary cross-entropy", "categorical cross entropy") and losses that look at larger regions such as "adversarial loss" [14]. This is a very large scale optimization problem and is best used with specialized hardware (GPU workstations or high performance computers) to train models in a reasonable time frame (hours to days). Specifically, an exemplary training procedure can include using a specific variant of stochastic gradient descent optimization (called "Adam" [15]) with data parallelism using multiple GPUs wherein several data samples are evaluated on each GPU and the gradient estimate from all the GPUs were averaged to get the batch gradient estimate used by the optimizer. Many standard neural network training options (such as drop-out regularization, batch-norm etc. can be used to improve the quality of trained models).

The training data for the artificial neural network can include synthetically generated subsurface physical property models consistent with the provided geological priors, and the computer simulated data based on the governing equations of geophysics and the generated subsurface physical property models.

The training data for the artificial neural network can include migrated or stacked geophysical data (e.g., seismic) with interpretations done manually.

The artificial neural network can be trained using a combination of synthetic and real geophysical data.

Handling Directionality in 2D Networks—step 603.

For 2D networks, the present technological advancement can extract patches along all 3 orthogonal directions and train a different network for views along each direction. The results from these networks can be fused to provide the final fault probability volume in 3D. 3D networks are robust to this variation in data view (e.g., there are multiple ways to slice a 3D patch into 2D patches (side view, top view, etc.), but only one way to look at a 3D patch).

Prediction: Using 2D Networks—604.

Using fully convolutional networks allows for prediction on input images that are different in size from the patch size used for training. The input image can be propagated through the trained network using a sequence of operations defined by the network (FIG. 1.) and the parameters learned during training. The networks will always generate an output label map that is the same size relative to the input image. The present technological advancement can therefore run 2D models on whole "slices" of seismic data. Alternately, if memory is limited, patches can be extracted from the test volume, propagated through the network, and the output can be stitched back into a volume corresponding to the size of the test volume. If there are multiple models trained on different views, the present technological advancement can generate a fault probability volume for each model and the final decision would involve fusion of these volumes. The method can carry out a scheme to select meaningful predictions from the same orientation used during the training mode (x, y, z). That scheme can fuse the predictions to provide the final fault probability volume in 3D. The fusion itself may be a simple method (e.g., using multiplication of individual probability volumes, averaging of individual probability volumes, taking the max of individual probability etc.) or the present technological advancement could train a 3D network with each of these individual volumes (and potentially the seismic data as well) as a channel to learn the best way to fuse the volumes.

Prediction: Using 3D Networks—604.

The present technological advancement can run the learned 3D model on the entire seismic volume to get the fault interpretation in one shot (i.e., all at once). Computationally, GPU memory can be a limiting factor in implementing this and the 3D volume may need to be broken into manageable chunks to perform the prediction. However, this is not a limitation of the present technological advancement, but is rather a limitation of some GPU computers.

Post-Processing.

All post-processing steps (e.g., Median Filtering, DBScan based outlier detection, Ridge detection [16]) that take an attribute volume for fault interpretation can still be applied to the volume generated by the above steps to fine tune results. For example, one can review the method mentioned in [4]. Post-processing may also include feeding the output of one neural network into another neural network (either recursively into the same network or into another network trained specifically for post-processing). The input to the next neural network may also include the original seismic image. It is possible to have more than 2 steps in such a post-processing pipeline.

Numerical Examples

The following numerical examples show that the present technological advancement can construct fault interpretations with good accuracy. Fault interpretation refers to the techniques associated with creating maps from seismic data depicting the geometry of the subsurface fault structure. In this particular case a probability volume from the application of convolutional neural networks will be used to provide a reasonable prediction of the presence of faults. However, the accuracy of results obtained by the present technological advancement may improve with the use of more sophisticated DNN architectures (e.g., ResNets [13]) and larger datasets.

For these examples, training data included manually interpreted faults from a cropped seismic volume.

Measurements from the seismic data, such as amplitude, dip, frequency, phase, or polarity, often called seismic attributes or attributes. A seismic attribute is a quantity extracted or derived from seismic data that can be analyzed in order to enhance information that might be more subtle in a traditional seismic image. Statistics are given below.

Seismic volume dimensions: 1663×1191×541
Voxel count: 1,071,522,453.
Fault voxels: 35,310,187 (4.7%) (Note: each fault interpretation is made 7 pixels thick to overcome error in manual labeling)

Figure 4A:
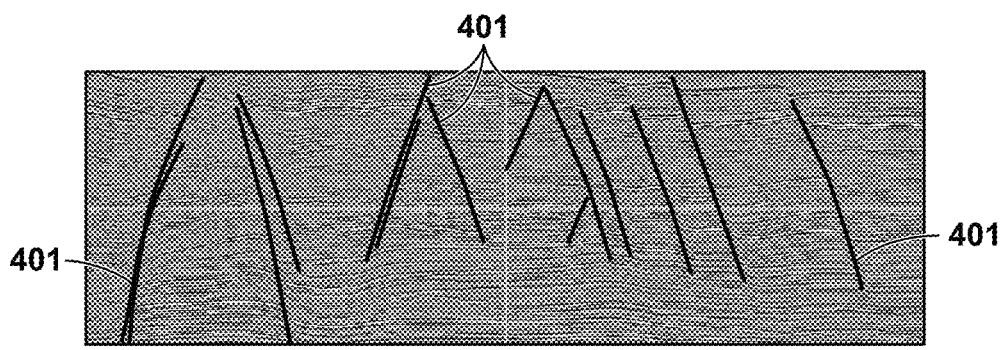
FIG. 4A illustrates an example of a vertical slice with manual interpretation of the faults.
Figure 4B:
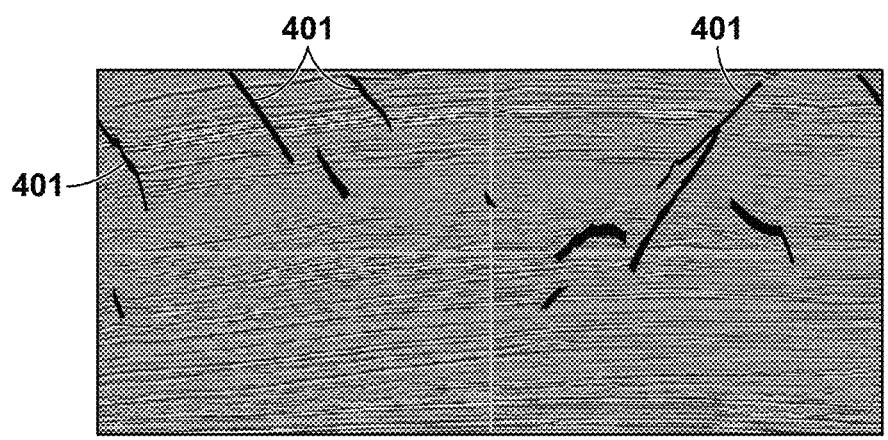
FIG. 4B illustrates an example of a slice in a direction orthogonal to the manual interpretation.
Figure 4C:
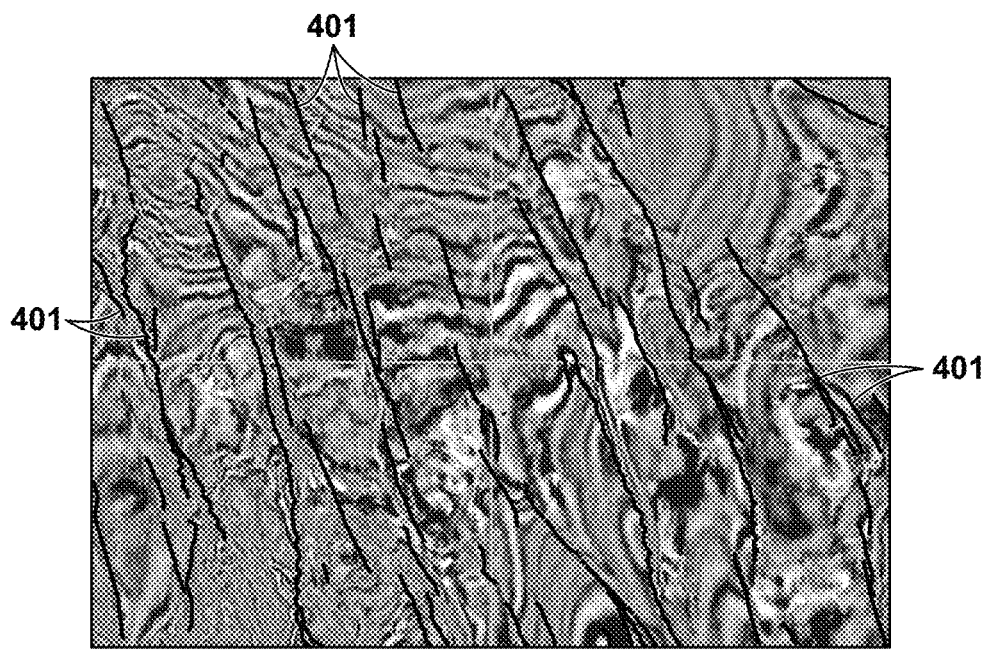
FIG. 4C illustrates an example of a time slice with manual interpretation.

FIGS. 4A-C are exemplary slices from a training volume. FIG. 4A illustrates an example of a vertical slice with manual interpretation of the faults. FIG. 4B illustrates an example of a slice in a direction orthogonal to the manual interpretation. FIG. 4C illustrates an example of a time slice with manual interpretation. Reference numbers 401 indicate the manually interpreted faults.

FIGS. 5A-C illustrate samples of 2D patches extracted from the training volume and network predictions for the selected patches. FIG. 5A illustrates an example of input training patches. FIG. 5B illustrates an example of target fault masks for input training patches. FIG. 5C illustrates predicted fault masks for input training patches.

It is interesting to note that even on the training data set, the network is able to identify faults that were missing during manual interpretation (see arrows 501) confirming the hypothesis that the network has "learned" to recognize faults and can generalize to unseen faults beyond the training data.

Figure 7C:
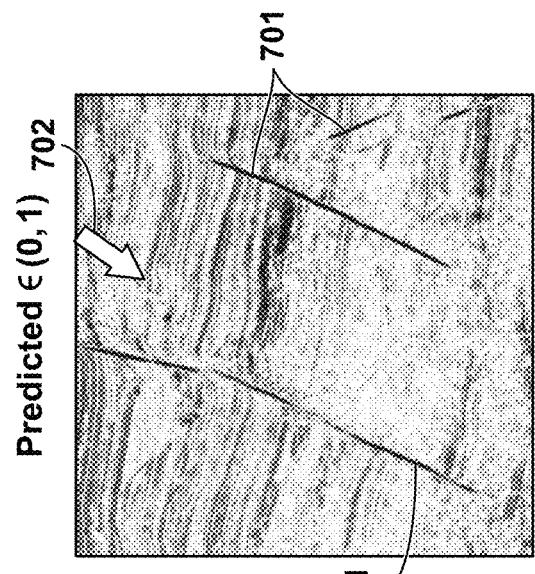
FIGS. 7A, 7B, and 7C illustrate exemplary results obtained from the present technological advancement.
Figure 7B:
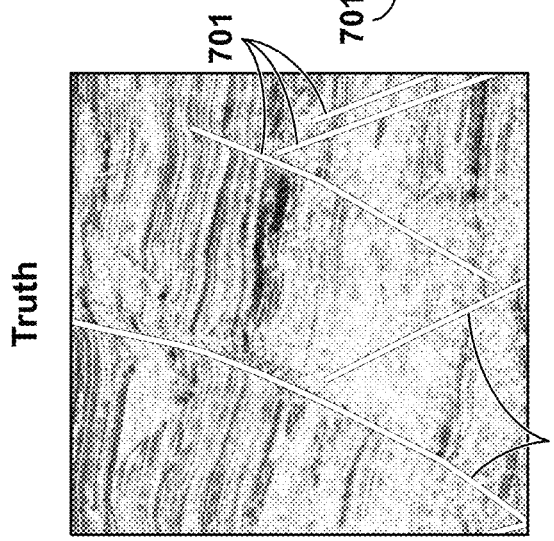
Figure 7A:
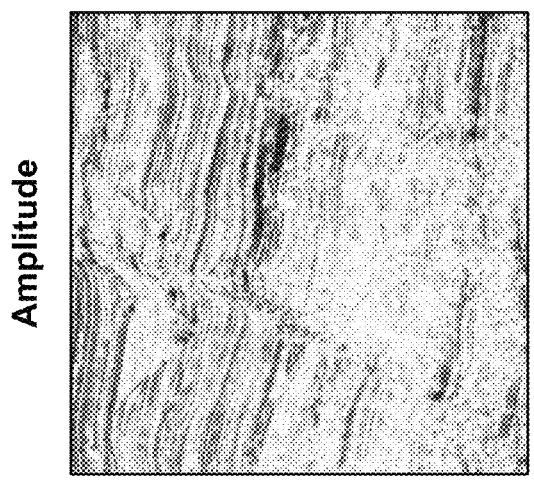

FIGS. 7A-C illustrate another example for the present technological advancement. FIG. 7A illustrates a slice from an amplitude volume. FIG. 7B illustrates the manually interpreted faults, wherein faults 701 are identified. FIG. 7C illustrates the results of the present technological advancement. While the present technological advancement did not identify all of the faults in FIG. 7B, it did identify previously un-identified fault 702.

Figures 8A, 8B, 8C:
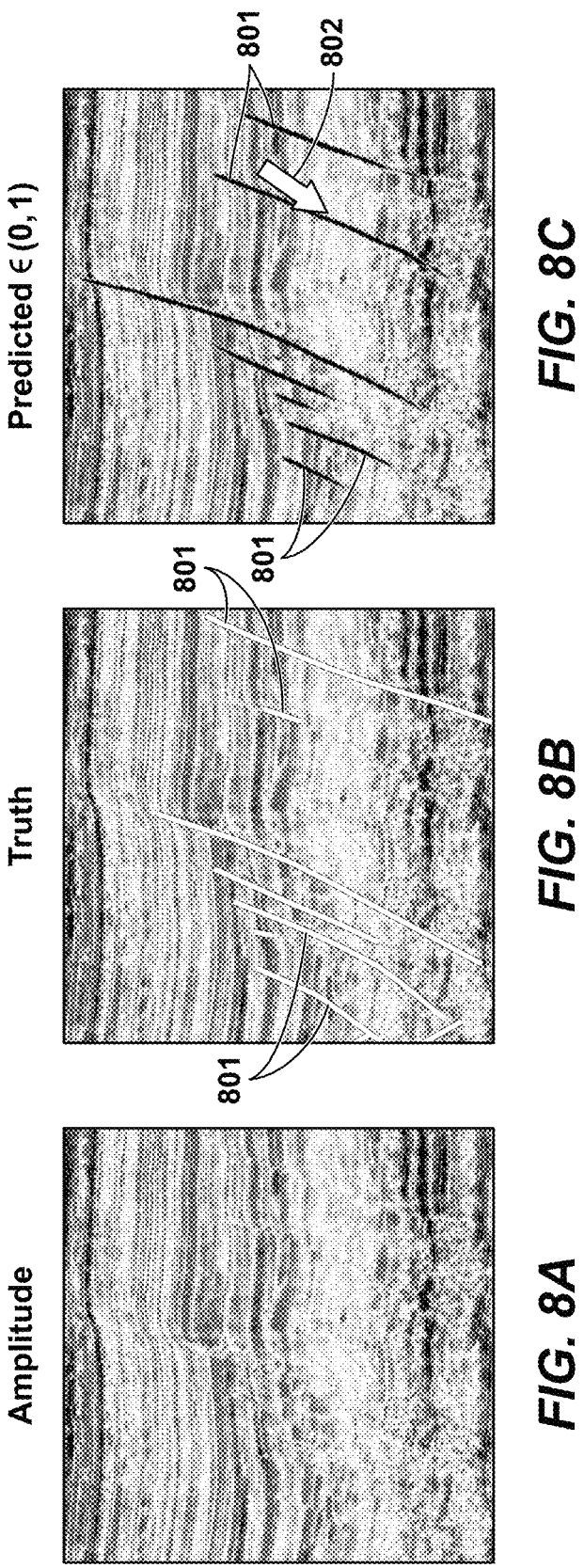
FIGS. 8A, 8B, and 8C illustrate exemplary results obtained from the present technological advancement.

FIGS. 8A-C illustrate another example for the present technological advancement. FIG. 8A illustrates a slice from an amplitude volume. FIG. 8B illustrates the manually interpreted faults, wherein faults 801 are identified. FIG. 8C illustrates the results of the present technological advancement. While the present technological advancement did not identify all of the faults in FIG. 7B, it did identify previously un-identified fault 802.

FIGS. 9A-C illustrate another example for the present technological advancement. FIG. 9A illustrates a slice from an amplitude volume. FIG. 9B illustrates the manually interpreted faults, wherein faults 901 are identified. FIG. 9C illustrates the results of the present technological advancement. While the present technological advancement did not identify all of the faults in FIG. 7B, it did identify previously un-identified fault 902.

The interpreted faults can be used to explore for or manage hydrocarbons. Fault and horizon interpretations have been used to describe subsurface structure and trapping mechanisms for hydrocarbon exploration. Many or the world's largest fields are compartmentalized and trapped by faults, therefore, in exploration sense, subsurface interpretation could be one of the most critical tasks in order to find oil and gas. Different geoscientists and seismic interpreters use a variety of approaches and philosophies in their interpretations, however all of the traditional methods are time consuming and data dependent. Automation via application of convolutional neural networks has the potential to accelerate this long process and reduce the time that takes to identify and exploration type opportunity. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

In all practical applications, the present technological advancement must be used in conjunction with a computer, programmed in accordance with the disclosures herein. Preferably, in order to efficiently perform the present technological advancement, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

The following references are incorporated by reference in their entirety:

[1] Akcelik, V., Denli, H., Kanevsky, A., Patel, K. K., White, L. and Lacasse M.-D. "Multiparameter material model and source signature full waveform inversion", SEG Technical Program Expanded Abstracts, pages 2406-2410, 2012;

[2] Denli, H., Akcelik, V., Kanevsky A., Trenev D., White L. and Lacesse, M.-D. "Full-wavefield inversion for acoustic wave velocity and attenuation", SEG Technical Program Expanded Abstracts, pages 980-985, 2013;

[3] Paleoscan software available from Eliis;

[4] Computer-Assisted Fault Interpretation of Seismic Data, US Patent Application Publication (Pub. No. US 2015/0234070 A1), Aug. 20, 2015;

[5] Gibson, D., Spann, M., & Turner, J. "Automatic Fault Detection for 3D Seismic Data." DICTA. 2003;

[6] LeCun, Y., Bengio, Y., & Hinton, G., "Deep Learning.", Nature 521, 436-444 (28 May 2015) doi:10.1038/nature14539;

[7] Zhang, C., Frogner, C. & Poggio, T. "Automated Geophysical Feature Detection with Deep Learning." GPU Technology Conference, 2016;

[8] Araya-Polo, M., Dahlke, T., Frogner, C., Zhang, C., Poggio, T., & Hohl, D. "Automated fault detection without seismic processing.", The Leading Edge, Special Edition: Data analytics and machine learning, March 2017;

[9] Jiang, Y., Wulff, B., "Detecting prospective structures in volumetric geo-seismic data using deep convolutional neural networks.", Poster presented on Nov. 15, 2016 at the annual foundation council meeting of the Bonn-Aachen International Center for Information Technology (b-it);

[10] Simonyan, K. & Zisserman, A., "Very Deep Convolutional Networks for Large-Scale Image Recognition.", arXiv technical report, 2014;

[11] Jonathan Long, Evan Shelhamer, and Trevor Darrell., "Fully Convolutional Networks for Semantic Segmentation." CVPR 2015;

[12] Olaf Ronneberger, Philipp Fischer, Thomas Brox, "U-Net: Convolutional Networks for Biomedical Image Segmentation", Medical Image Computing and Computer-Assisted Intervention (MICCAI), Springer, LNCS, Vol. 9351: 234-241, 2015;

[13] K He, X Zhang, S Ren, J Sun, "Deep Residual Learning for Image Recognition" 2016 IEEE Conference on Computer Vision and Pattern Recognition (CVPR);
[14] Goodfellow, I. et al., Generative Adversarial Nets, Advances in Neural Information Processing Systems 27, NIPS 2014;
[15] Kingma, P. D., & Ba, J., "Adam: A Method for Stochastic Optimization", ICLR, 2015; and
[16] Koenderink, Jan J., van Doom, Andrea J. (May 1994). "2+1-D differential geometry". Pattern. Recognition Letters. 15: 439-443.

What is claimed is:

1. A method to automatically interpret a subsurface feature within geophysical data, the method comprising:
storing, in a computer memory, geophysical data obtained from a survey of a subsurface region; and
extracting, with a computer, a feature probability volume by processing the geophysical data with one or more fully convolutional neural networks, which are trained to relate the geophysical data to at least one subsurface feature, wherein the extracting includes fusing together outputs of the one or more fully convolutional neural networks;
wherein the feature probability volume is a 4D tensor that conveys a vector at each voxel within the volumes indicating the likelihood of that voxel belonging to a certain class.

2. The method of claim 1, wherein the geophysical data is a migrated or stacked seismic volume.

3. The method of claim 1, wherein the geophysical data includes attributes extracted from a migrated or stacked seismic volume.

4. The method of claim 1, further comprising:
training the one or more fully convolutional neural networks with training data, wherein the training data includes synthetically generated subsurface physical models consistent with provided geological priors and computer simulated data based on governing equations of geophysics and the synthetically generated subsurface physical model.

5. The method of claim 4, wherein the training data includes migrated or stacked seismic data with manual interpretations.

6. The method of claim 4, wherein the training data is a blend of synthetic and real data.

7. The method of claim 4, wherein a plurality of neural networks are used and the plurality of neural networks have different architectures and the training includes training the plurality of neural networks with different datasets, wherein said plurality of neural networks comprises the one or more fully convolutional neural networks.

8. The method of claim 1, wherein the one or more fully convolutional neural networks are based on a U-net architecture.

9. The method of claim 1, wherein the one or more fully convolutional neural networks are based on augmentations to a U-net architecture.

10. The methods of claim 1, wherein the one or more fully convolutional neural networks use 3D convolution or filtering operations.

11. The method of claim 1, wherein the fusing is done using voxelwise operations.

12. The method of claim 11, wherein the voxelwise operations include averaging.

13. The method of claim 11, wherein the voxelwise operations include taking a maximum value.

14. The method of claim 1, wherein the fusing is done by feeding multiple prediction volumes, and the original data, into another artificial neural network.

15. The method of claim 1, wherein the at least one subsurface feature is one or more of faults, channels, or environments of deposition.

16. The method of claim 1, wherein the at least one subsurface feature is a fault.

17. The method of claim 1, wherein the extracting includes performing seismic feature interpretation via voxelwise labeling.

18. The method of claim 1, wherein the extracting includes running a learned 2D or 3D model on an entirety of a seismic volume to obtain a fault interpretation of the seismic Volume all at once.

19. The method of claim 1, wherein the extracting includes generating an output label map that is related to a size of an input image.

* * * * *